US012580627B2

(12) United States Patent
     Sakhnini et al.

(10) Patent No.: US 12,580,627 B2
(45) Date of Patent: Mar. 17, 2026

(54) BEAM-SPECIFIC PARAMETERS FOR CORESET OR SS SET HAVING DIFFERENT CHARACTERISTICS

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 627 days.

(21) Appl. No.: 17/367,238

(22) Filed: Jul. 2, 2021

(65) Prior Publication Data

US 2022/0022192 A1     Jan. 20, 2022

Related U.S. Application Data

(60) Provisional application No. 63/052,305, filed on Jul. 15, 2020.

(51) Int. Cl.
    *H04W 72/044*     (2023.01)
    *H04B 7/06*       (2006.01)
        (Continued)

(52) U.S. Cl.
    CPC ...... *H04B 7/06952* (2023.05); *H04W 72/046* (2013.01); *H04W 72/23* (2023.01);
        (Continued)

(58) Field of Classification Search
    CPC .. H04B 7/0408; H04B 7/0694; H04B 7/0695; H04B 7/088; H04B 7/06964;
        (Continued)

(56) References Cited

U.S. PATENT DOCUMENTS

2020/0007194 A1 * 1/2020 John Wilson ......... H04W 76/11
2020/0014510 A1 * 1/2020 Wu ........................ H04W 72/53
        (Continued)

OTHER PUBLICATIONS

R2-1711370, "Dedicated resource configuration for beam failure recovery", Oct. 9-13, 2017, pp. 1-3 (Year: 2017).*
        (Continued)

*Primary Examiner* — Salvador E Rivas

(74) *Attorney, Agent, or Firm* — Procopio, Cory, Hargreaves & Savitch LLP

(57) ABSTRACT

This disclosure provides systems, devices, apparatus and methods, including computer programs encoded on storage media, for beam-specific parameters. In a first aspect, a UE may receive a configuration for behavior associated with one or more periodic resources, where the configuration may be associated with at least one beam. The UE may further receive an activation of a beam and apply the behavior associated with the one or more periodic resources, which may be associated in response to receiving the activation of the beam. In a second aspect, a base station may transmit, to the UE, the configuration for the behavior associated with the one or more periodic resources. The base station may further transmit, to the UE, the activation of the beam and transmit or receive communication with the UE based on the behavior configured for the one or more periodic resources.

30 Claims, 13 Drawing Sheets

(51) Int. Cl.

| | |
|---|---|
| *H04W 72/23* | (2023.01) |
| *H04W 72/231* | (2023.01) |
| *H04W 72/232* | (2023.01) |
| *H04W 72/53* | (2023.01) |
| *H04W 72/54* | (2023.01) |

(52) U.S. Cl.
CPC ....... *H04W 72/231* (2023.01); *H04W 72/232* (2023.01); *H04W 72/53* (2023.01); *H04W 72/54* (2023.01)

(58) Field of Classification Search
CPC . H04W 72/231; H04W 72/232; H04W 72/11; H04W 72/14
See application file for complete search history.

(56) References Cited

U.S. PATENT DOCUMENTS

| | | | |
|---|---|---|---|
| 2020/0350972 A1* | 11/2020 | Yi ............................. | H04L 1/12 |
| 2021/0288702 A1* | 9/2021 | Grant ................... | H04B 7/0695 |
| 2022/0103227 A1* | 3/2022 | Lee ........................ | H04W 76/19 |
| 2022/0110181 A1* | 4/2022 | Miao ..................... | H04L 1/1822 |
| 2022/0116182 A1* | 4/2022 | Shi ........................ | H04L 5/0048 |
| 2022/0303788 A1* | 9/2022 | Zhang .................. | H04B 7/0404 |
| 2023/0102996 A1* | 3/2023 | Harada ................. | H04W 72/23 |
| | | | 370/329 |
| 2023/0108044 A1* | 4/2023 | Zhang ................... | H04L 5/0091 |
| | | | 370/329 |
| 2023/0199794 A1* | 6/2023 | Matsumura .............. | H04B 7/02 |
| | | | 370/329 |
| 2024/0259078 A1* | 8/2024 | Gao ...................... | H04W 16/28 |

OTHER PUBLICATIONS

R1-1801825, "Remaining issues on beam failure recovery", Feb. 26-Mar. 2, 2018, pp. 1-4 (Year: 2018).*

ETSI, "TS 138 214 V15.9.0", Apr. 2020, pp. 1-129 (Year: 2020).*
International Search Report and Written Opinion—PCT/US2021/040557—ISA/EPO—Oct. 12, 2021.
Lenovo, et al., "Remaining Issues on Beam Failure Recovery," 3GPP Draft, 3GPP TSG RAN WG1 Meeting #92, R1-1801825, 3rd Generation Partnership Project (3GPP), Mobile Competence Centre, 650, Route Des Lucioles, F-06921, Sophia-Antipolis Cedex, France, vol. RAN WG1, No. Athens, Greece Feb. 26, 2018-Mar. 2, 2018, Feb. 16, 2018 (Feb. 16, 2018), XP051397010, 4 pages, Retrieved from the Internet: URL: http://www.3gpp.org/ftp/tsg%5Fran/WG1%5FRL1/TSGR1%5F92/Docs/ [retrieved on Feb. 16, 2018], the whole document.
Mediatek Inc: "Summary 1 on Remaing Issues on Beam Failure Recovery", 3GPP Draft, 3GPP TSG RAN WG1 Meeting #93, R1-1807661_SUMMARY_BFR_V03, 3rd Generation Partnership Project (3GPP), Mobile Competence Centre, 650, Route Des Lucioles, F-06921, Sophia-Antipolis Cedex, France, vol. RAN WG1, No. Busan, Korea, May 21, 2018-May 25, 2018, May 24, 2018 (May 24, 2018), XP051463292, 26 Pages, Retrieved from the Internet: URL: http://www.3gpp.org/ftp/tsg%5Fran/WG1%5FRL1/TSGR1%5F93/Docs [retrieved on May 24, 2018] Section 2.1.7.
NTT DOCOMO: "General Views on Beam Management", 3GPP Draft, 3GPP TSG RAN WG1 Meeting #87, R1-1612728, General Views on Beam Management for NR, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 14, 2016-Nov. 18, 2016, Nov. 13, 2016 (Nov. 13, 2016), XP051176671, 8 pages, Retrieved from the Internet: URL: http://www.3gpp.org/ftp/Meetings_3GPP_SYNC/RAN1/Docs/ [retrieved on Nov. 13, 2016], Section 2, figure 1.
Qualcomm Incorporated: "Fast SCG and SCell Activation", 3GPP TSG-RAN WG1 #97, R1-1907306, 3rd Generation Partnership Project (3GPP), Mobile Competence Centre, 650, Route Des Lucioles, F-06921, Sophia-Antipolis Cedex, France, vol. RAN WG1, Reno, USA, May 13, 2019-May 17, 2019, May 13, 2019 (May 13, 2019), XP057728746, XP051709329, pp. 1-11, Retrieved from the Internet: URL: http://www.3gpp.org/ftp/Meetings%5F3GPP%5FSYNC/RAN1/Docs/R1%2D1907306%2Ezip, http://www.3gpp.org/ftp/tsg%5Fran/WG1%5FRL1/TSGR1%5F97/Docs/R1%2D1907306%2Ezip.

* cited by examiner

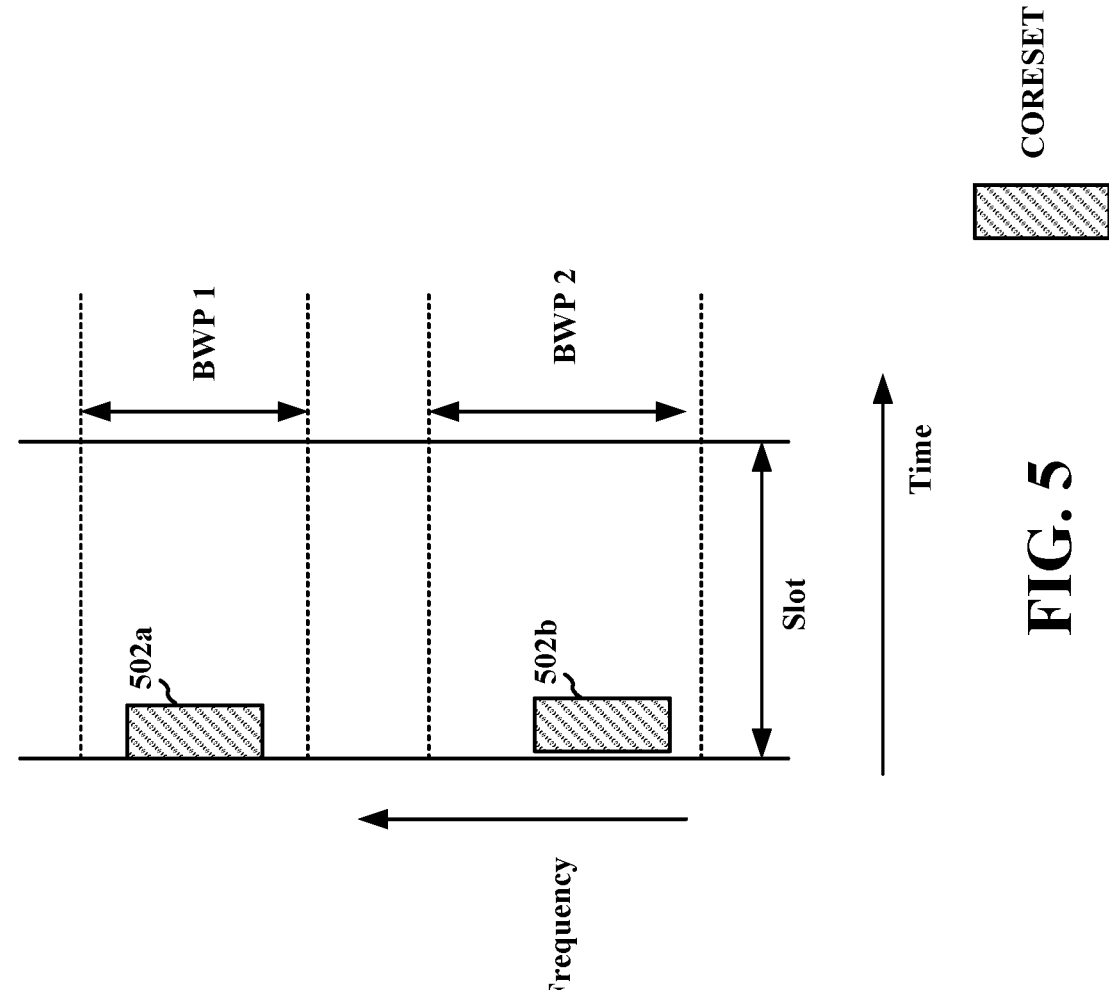
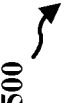
FIG. 5

802

Receive a configuration for behavior associated with one or more periodic resources, the configuration being associated with at least one beam

804

Receive an activation of a beam

806

Apply the behavior associated with the one or more periodic resources associated in response to receiving the activation of the beam

800

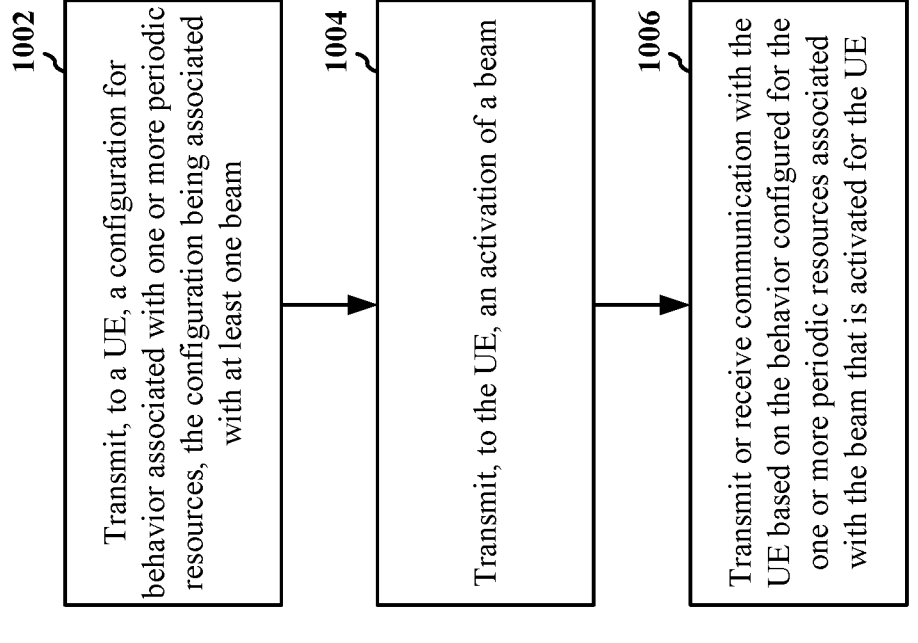

1000

1002

Transmit, to a UE, a configuration for behavior associated with one or more periodic resources, the configuration being associated with at least one beam

1004

Transmit, to the UE, an activation of a beam

1006

Transmit or receive communication with the UE based on the behavior configured for the one or more periodic resources associated with the beam that is activated for the UE

FIG. 10

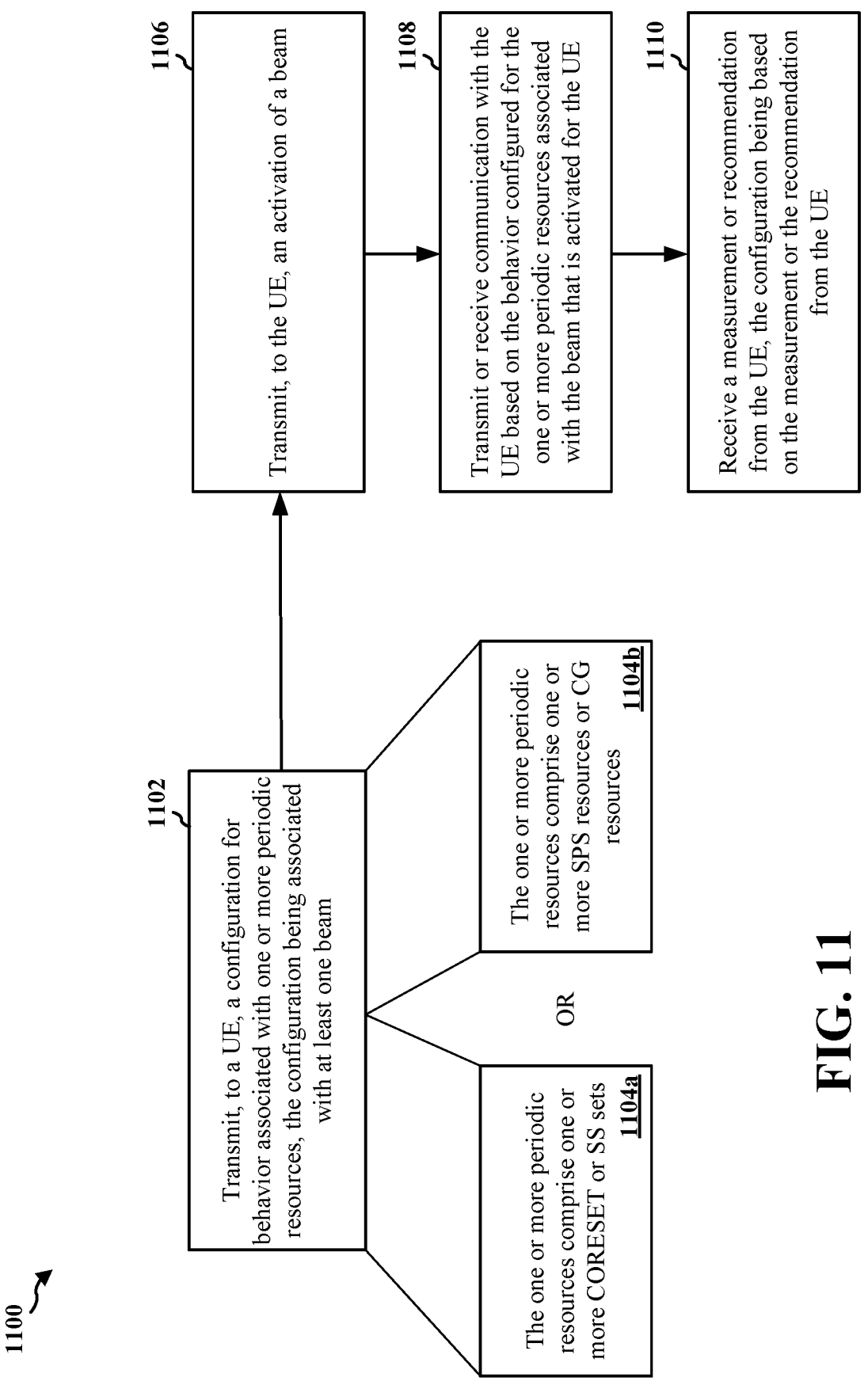

1100

1102 — Transmit, to a UE, a configuration for behavior associated with one or more periodic resources, the configuration being associated with at least one beam The one or more periodic resources comprise one or more CORESET or SS sets   1104a

OR

The one or more periodic resources comprise one or more SPS resources or CG resources   1104b

1106 — Transmit, to the UE, an activation of a beam

1108 — Transmit or receive communication with the UE based on the behavior configured for the one or more periodic resources associated with the beam that is activated for the UE 1110 — Receive a measurement or recommendation from the UE, the configuration being based on the measurement or the recommendation from the UE

FIG. 11

BEAM-SPECIFIC PARAMETERS FOR CORESET OR SS SET HAVING DIFFERENT CHARACTERISTICS

CROSS REFERENCE TO RELATED APPLICATION(S)

This application claims the benefit of and priority to U.S. Provisional Application Ser. No. 63/052,305, entitled "BEAM-SPECIFIC PARAMETERS" and filed on Jul. 15, 2020, which is expressly incorporated by reference herein in its entirety.

TECHNICAL FIELD

The present disclosure relates generally to communication systems, and more particularly, to beam-specific parameters.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive a configuration for behavior associated with one or more periodic resources, the configuration being associated with at least one beam; receive an activation of a beam; and apply the behavior associated with the one or more periodic resources associated in response to receiving the activation of the beam.

In a further aspect of the disclosure, a method, a computer-readable medium, and an apparatus are provided. The apparatus may transmit, to a user equipment (UE), a configuration for behavior associated with one or more periodic resources, the configuration being associated with at least one beam; transmit, to the UE, an activation of a beam; and transmit or receiving communication with the UE based on the behavior configured for the one or more periodic resources associated with the beam that is activated for the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 illustrates an example diagram for time and frequency resources having multiple bandwidth parts (BWPs) and a control resource set (CORESET) for each of the multiple BWPs.

FIG. 10 is a flowchart of a method of wireless communication at a base station.

FIG. 11 is a flowchart of a method of wireless communication at a base station.

DETAILED DESCRIPTION

Figure 1:
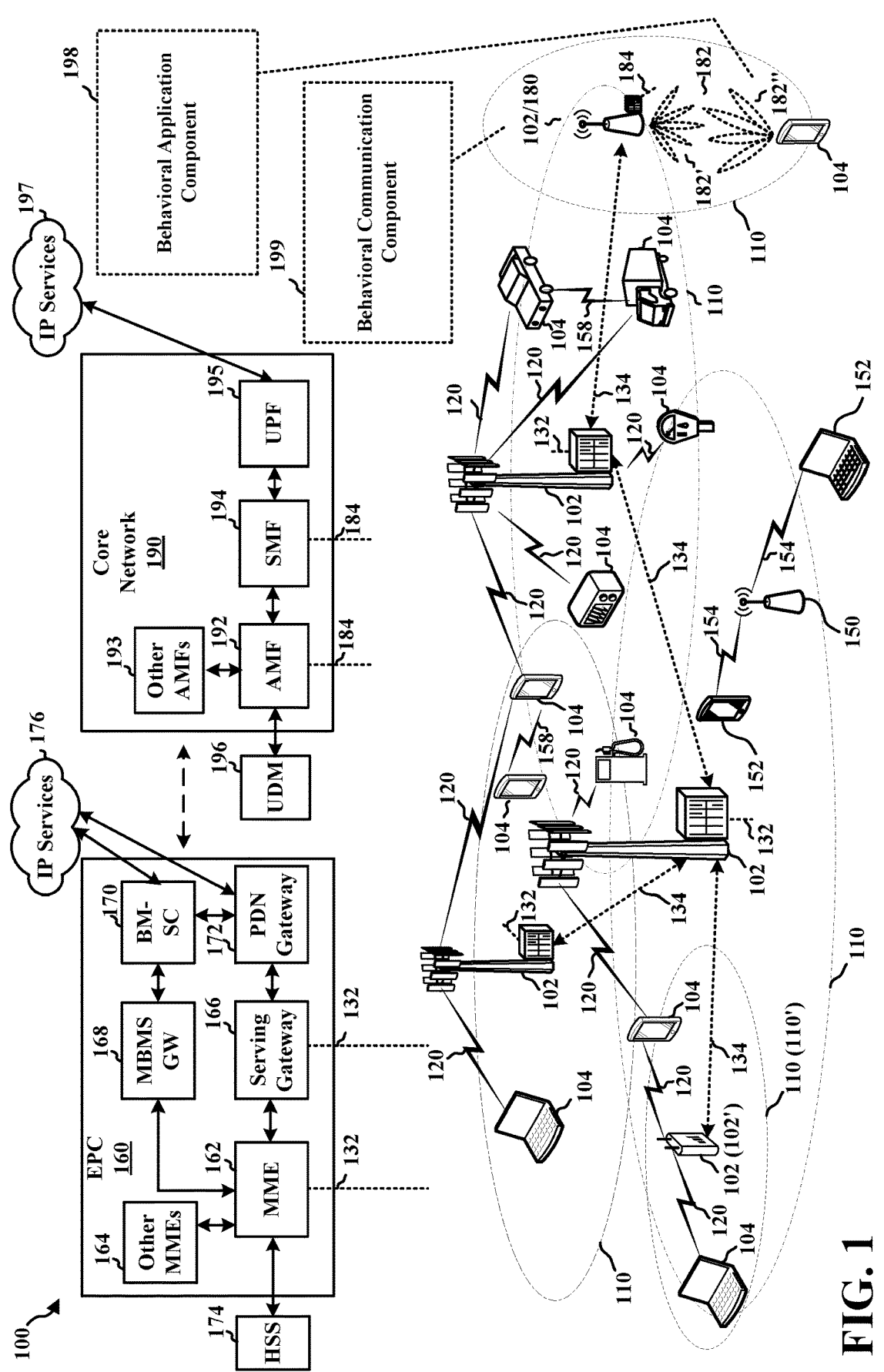
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102′ may operate in a licensed and/or an unlicensed frequency spectrum. When operating in an unlicensed frequency spectrum, the small cell 102′ may employ NR and use the same 5 GHz unlicensed frequency spectrum as used by the Wi-Fi AP 150. The small cell 102′, employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102′ or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182′. The UE 104 may receive the beamformed signal from the base station 180 in one or more receive directions 182″. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a behavioral application component 198 configured to receive a configuration for behavior associated with one or more periodic resources and at least one beam; receive an activation of a beam; and apply the behavior associated with the one or more periodic resources associated in response to receiving the activation of the beam. In certain aspects, the base station 180 may include a behavioral communication component 199 configured to transmit, to a UE, a configuration for behavior associated with one or more periodic resources, the configuration being associated with at least one beam; transmit, to the UE, an activation of a beam; and transmit or receiving communication with the UE based on the behavior configured for the one or more periodic resources associated with the beam that is activated for the UE. Although the following description may be focused on 5G NR, the concepts described herein may be applicable to other similar areas, such as LTE, LTE-A, CDMA, GSM, and other wireless technologies.

Figures 2A, 2B, 2C, 2D:
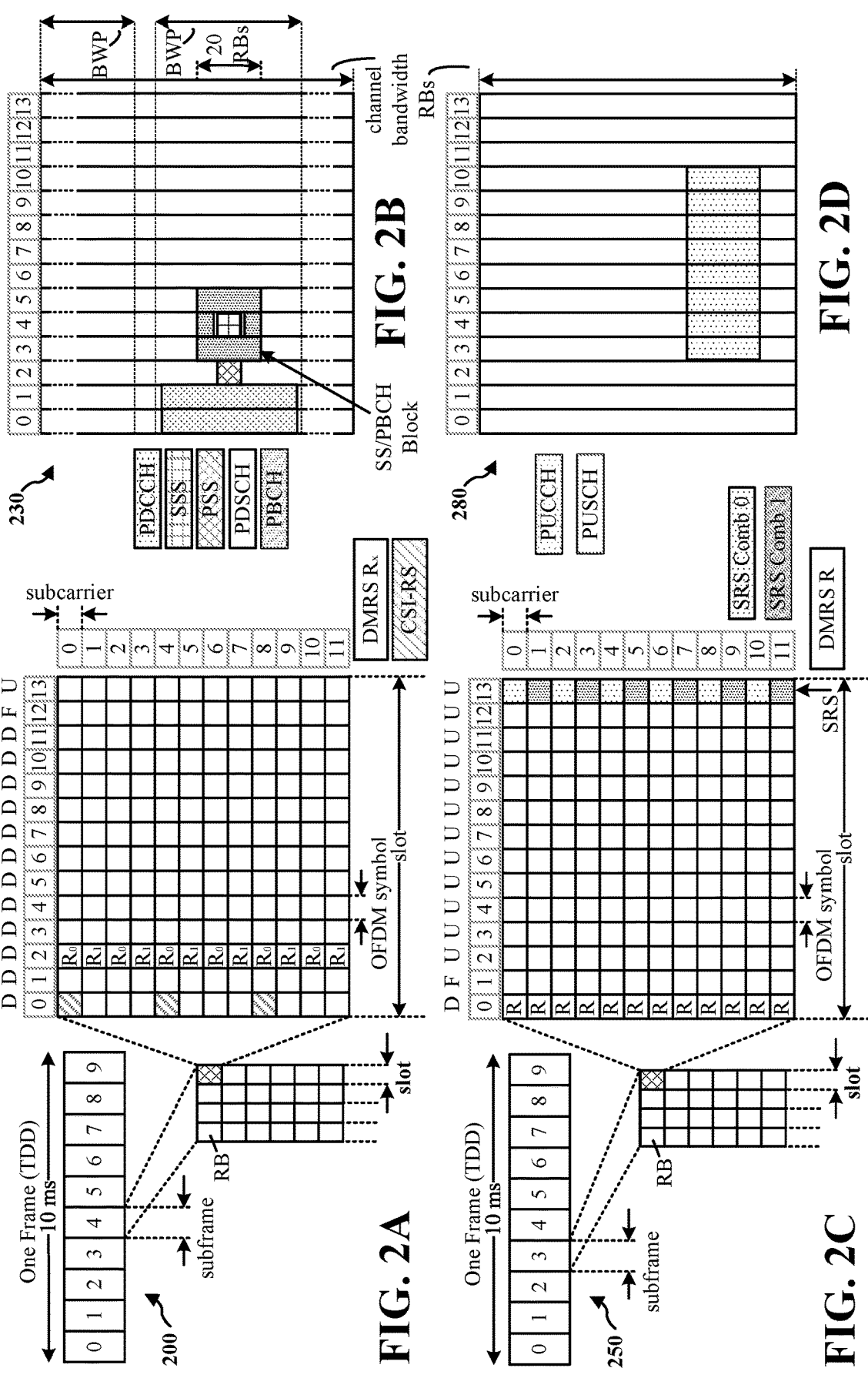
FIGS. 2A, 2B, 2C, and 2D are diagrams illustrating examples of a first 5G NR frame, DL channels within a 5G NR subframe, a second 5G NR frame, and UL channels within a 5G NR subframe, respectively.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2 slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
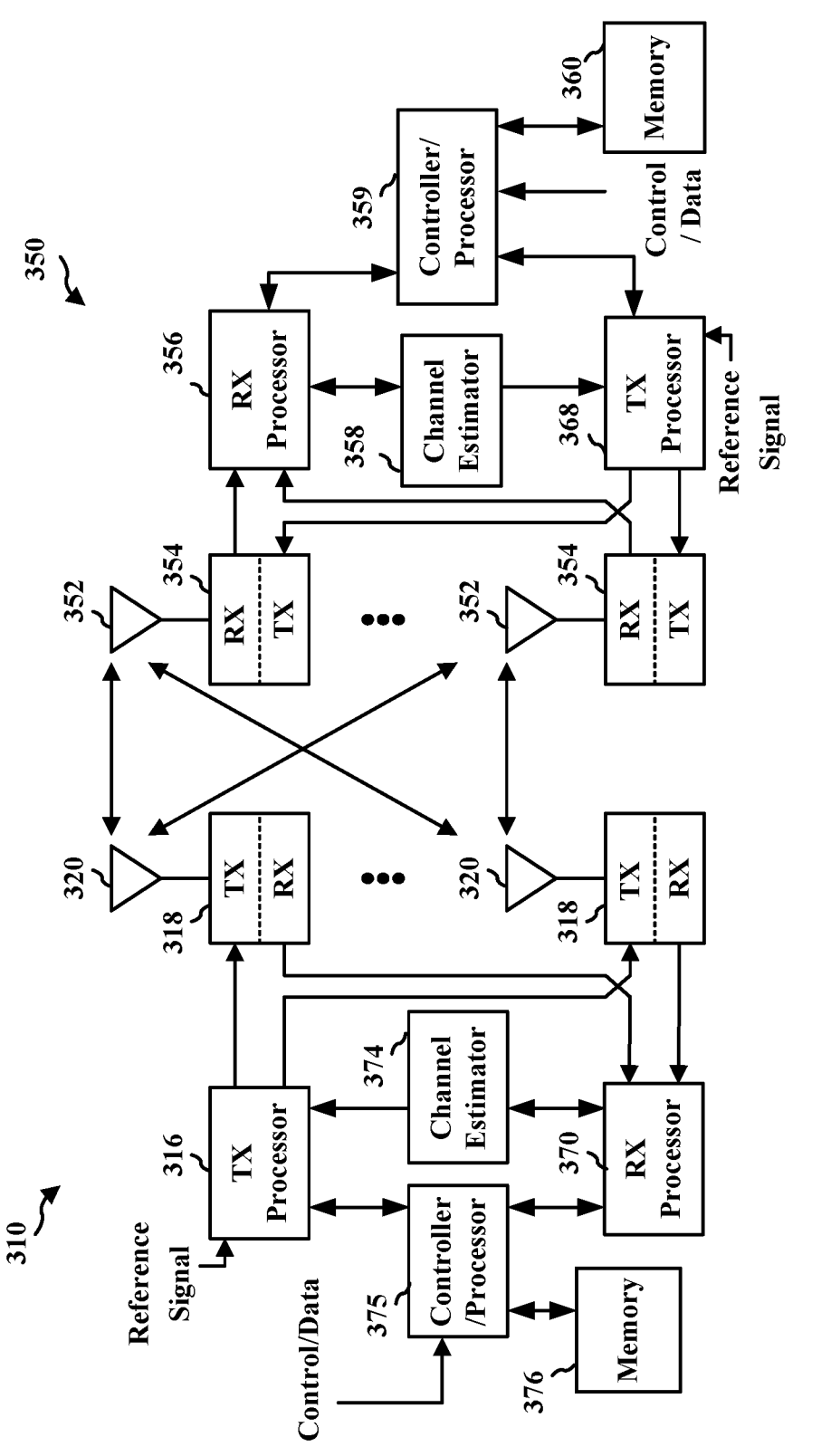
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE

350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the behavioral application component 198 of FIG. 1.

At least one of the TX processor 316, the RX processor 370, and the controller/processor 375 may be configured to perform aspects in connection with the behavioral communication component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
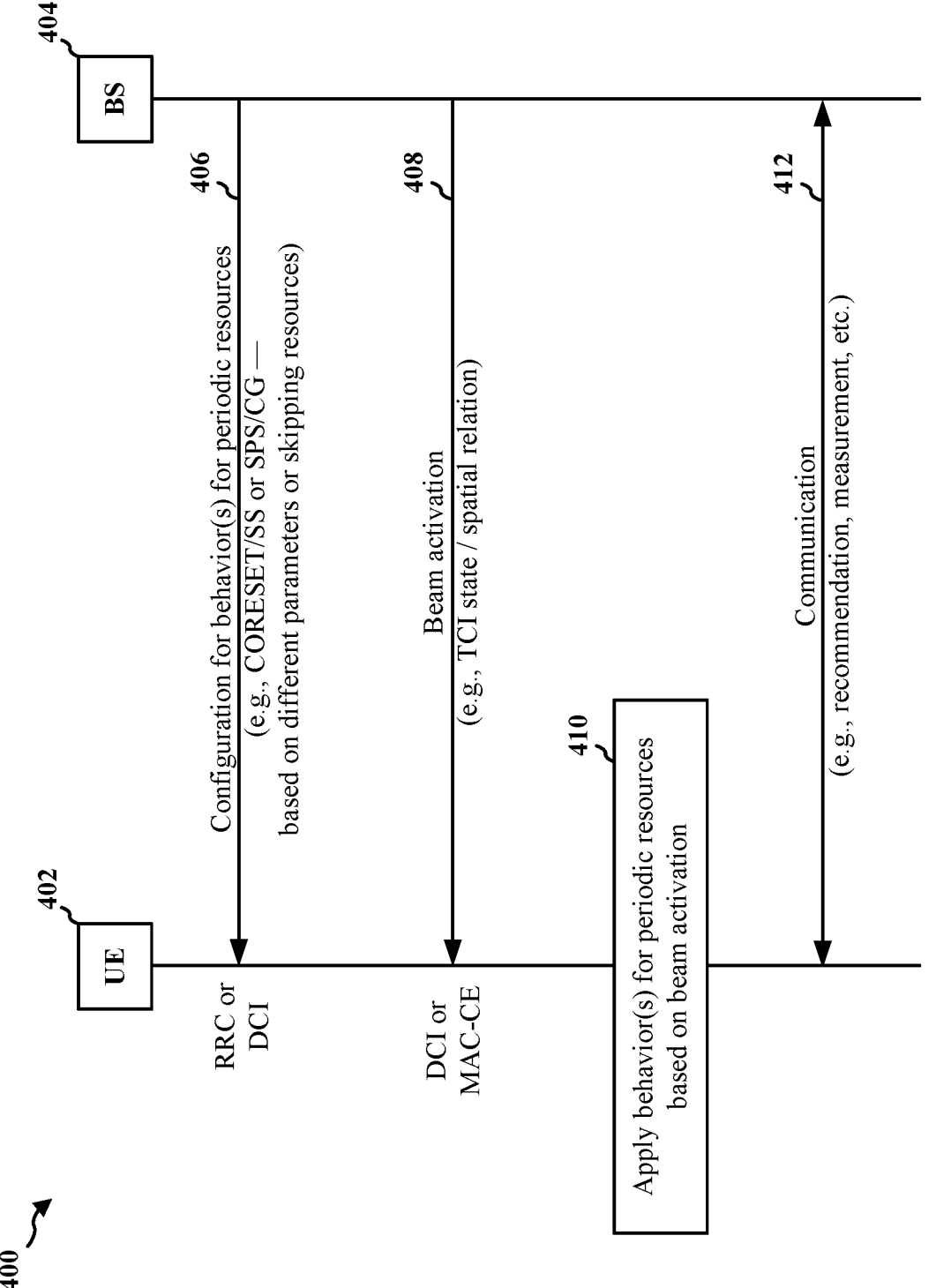
FIG. 4 is a call flow diagram illustrating communications between a UE and a base station.

FIG. 4 is a call flow diagram 400 illustrating communications between a UE 402 and a base station 404. At 406, the UE 402 may receive a configuration for one or more behaviors (e.g., a first behavior and/or a second behavior) associated with one or more periodic resources (e.g., a first periodic resource and/or a second periodic resource). In a first aspect, the periodic resources may include a CORESET or a search space (SS) set and the configuration may be received by the UE 402 in RRC signaling. The behavior may be based on different parameters for the CORESET or the SS sets (e.g., SS set periodicity, SS set offset, aggregation level, number of PDCCH candidates, BWP, etc.) or the behavior may be based on skipping SS set monitoring for a beam. In a second aspect, the periodic resources may include at least one of semi-persistent scheduling (SPS) resources or configured grant (CG) resources and may be received by the UE 402 in RRC signaling or DCI (e.g., first DCI). The behavior may be based on different parameters for the SPS/CG (e.g., number of RBs, time offset, modulation and coding scheme (MCS), BWP, frequency domain offset from BWP edge, etc.) or the behavior may be based on skipping SPS/CG resources for a beam.

At 408, the UE 402 may receive a beam activation signal from the base station 404. The beam may be indicated by a transmission configuration indicator (TCI) state, for example, when the periodic resources include a CORESET/SS set, and the beam may be indicated by a TCI state or a spatial relation, for example, when the periodic resources include SPS/CG. The beam activation may be received, at 408, by the UE 402 in MAC-control element (MAC-CE) or DCI (e.g., second DCI when the periodic resources include SPS/CG).

At 410, the UE 402 may apply the behavior(s) for the periodic resources based on the beam activation. For example, the UE 402 may apply the first behavior/first periodic resource if the UE 402 receives, at 408, the activation of the first beam, and the UE 402 may apply the second behavior/periodic resource if the UE 402 receives, at 408, the activation of the second beam.

At 412, the UE 402 may transmit or receive a communication with the base station 404. For example, the UE may transmit a recommendation or measurement to the base station 404. The recommendation or measurement may be based on the configuration received, at 406, by the UE 402 and/or the beam activation received, at 408, by the UE 402.

FIG. 5 illustrates an example diagram 500 for time and frequency resources having multiple BWPs (e.g., BWP1 and BWP2) and CORESETs 502a-502b for each of the multiple BWPs. Wireless communication systems may support both reduced capability devices, such as wearable devices, industrial wireless sensor networks (IWSN), surveillance cameras, low-end smartphones, etc., and higher capability devices, such as premium smartphones, vehicle-to-everything (V2X) devices, URLLC devices, eMBB devices, etc.

A reduced capability UE may have an uplink transmission power of at least 10 dB less than the uplink transmission power of a higher capability UE as well as a reduced transmission/reception bandwidth in comparison to the higher capability UE. For instance, the reduced capability UE may have an operating bandwidth of 5-10 MHz for both transmissions and receptions, whereas the higher capability UE may have an operating bandwidth of 20-100 MHz for both transmissions and receptions. In further aspects, the reduced capability UE may have a reduced number of Rx antennas (e.g., a single antenna), which may provide a decreased signal-to-noise ratio (SNR). Reduced capability UEs may also operate with reduced computational complexity.

For a plurality of stationary UEs within a coverage area of a base station, the respective locations of each UE may be such that some beams from the base station are directed toward more UEs than other beams from the base station. Beam overloading may occur when a direction of a single beam includes the locations of an increased number of UEs. Beam overloading may be based on a scheduling determination for a number of UEs covered by the beam in comparison to a number of resources that the beam includes. When too many UEs utilize a same beam, scheduling flexibility may be reduced and the base station may postpone certain scheduling operations. As a result of beam overloading, more frequent interference may occur for the UEs located within the beam and across beams.

In some instances, a stationary device may reduce operations of some beam directions. For example, other UEs utilizing different beam directions than the stationary device may be delayed based on the beams that are being utilized for the stationary device/reduced capability UE. If a PDCCH and/or a search space for a CORESET 520a-502b is not configured at a specific periodicity, the base station may tune the beam direction for the other UEs. The tuning may cause further operational limitations, which may cause the other UEs to be tuned away from the beam direction or scheduled at a different time than the reduced capability UE.

For a plurality of beams, each respective beam may be associated with different amounts of interference (e.g., beam-specific interference). As such, requirements for a PDCCH aggregation level may also be different. The number of RBs available for a specific UE may be different in order for the beam to be utilized by other UEs that are located within the same beam direction. In aspects, the SS may utilize different offsets for the other UEs located in the same beam direction. That is, the SS may be shifted left or right so that further UEs may be fit into the SS. The BWP may likewise be different to accommodate UEs or to tune away some of the interference. Different BWPs (e.g., BWP1 and BWP2) may be used for different beams. As a result, a same CORESET/SS configuration for all the beams may not be practical. Instead, beam configurations may be improved based on beam-specific parameters (e.g., CORESET/SS set parameters and/or SPS/CG parameters).

The CORESETs 502a-502b may correspond to sets of physical resources in time and frequency that a UE may use to monitor for PDCCH/DCI. Each CORESET 502a-502b may include one or more RBs in the frequency domain and one or more symbols in the time domain. As an example, a CORESET 502a-502b may have multiple RBs in the frequency domain and 1, 2, or 3 contiguous symbols in the time domain. An RE is a unit of one subcarrier in frequency over a single symbol in time. A CCE includes REGs, e.g., 6 REGs, in which a REG may correspond to one RB (e.g., 12 REs) during one orthogonal frequency division multiplexing (OFDM) symbol. REGs within the CORESETs 502a-502b may be numbered in increasing order in a time-first manner, starting with 0 for the first OFDM symbol and the lowest-numbered RB in the CORESETs 502a-502b. A UE may be configured with multiple CORESETs 502a-502b, where each CORESET 502a-502b is associated with a CCE-to-REG mapping.

A SS may include a set of CCEs, e.g., at different aggregation levels. The SS may indicate a number of candidates to be decoded by the UE. In configurations, the CORESETs 502a-502b may comprise multiple SS sets. A base station may configure multiple CORESETs 502a-502b and multiple SS sets for a UE. For example, the base station may configure three CORESETs and 10 SS sets per BWP for the UE. The UE may be configured for multiple BWPs, e.g., four BWPs. Each CORESET identifier (ID) of the CORESETs 502a-502b configured for the UE may map to a particular BWP, and each SS set ID of the multiple SS sets configured for the UE may map to a particular BWP.

Figure 6:
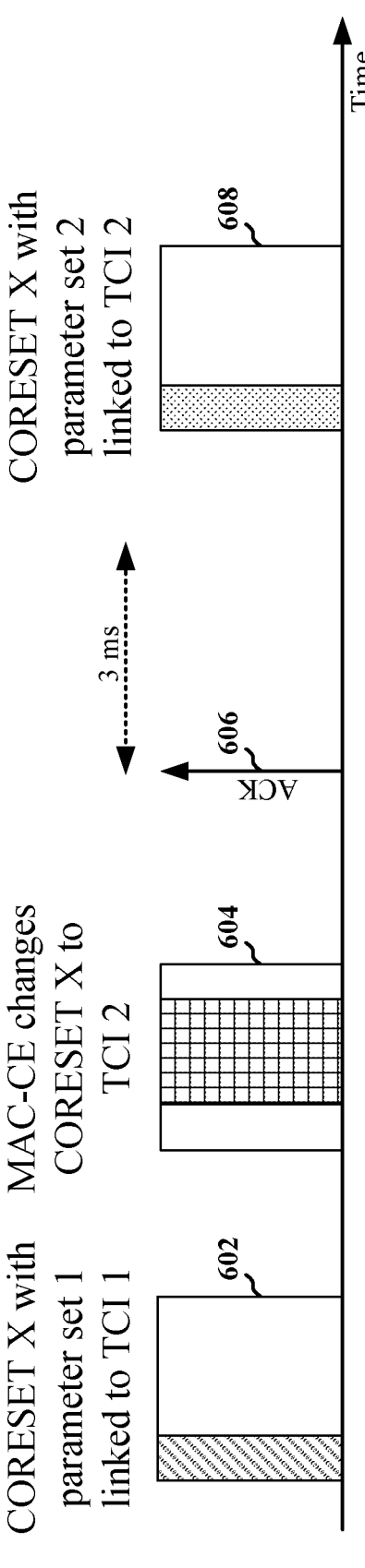
FIG. 6 is an example diagram corresponding to beam-specific CORESET/search space (SS) set parameters.

FIG. 6 is a diagram 600 corresponding to beam-specific CORESET/SS set parameters. In examples, one or more UEs may be configured with a CORESET/SS set having different behaviors per subset of beams (e.g., TCI states). A TCI state may include quasi co-location (QCL) information that the UE may utilize to derive a timing/frequency error and/or transmission/reception spatial filtering for transmitting/receiving a signal. A TCI state may be indicated, e.g., over DCI, which may indicate QCL relationships between another signal and the signal to be transmitted/received. For example, a TCI state may indicate a QCL relationship between DL RSs in one RS set and PDSCH/PDCCH DMRS ports. TCI states can provide information about different beam selections. A CORESET may be associated with a beam as indicated by the associated TCI state.

The behavior per subset of beams may be applied jointly to the CORESET and the SS set and updated based on a single command (e.g., DCI or MAC-CE), where associated sets of the TCI states and parameters may be predefined. A beam subset may include one or more beams (e.g., TCI states) that may correspond to a same TRP or different TRPs with the same or different PCIs. If the TRPs are different, the TRPs may have a same or different PCI (e.g., the TRPs may correspond to a same cell or different cells). In an example that includes 16 beams, a transmission configuration may be based on sets of 4 beams, where each set of 4 beams may have a same or different configuration from another set of 4 beams.

The UE may utilize a preconfigured CORESET/SS set behavior for application of a TCI state (e.g., 3 ms after the PUCCH carrying the acknowledgment (ACK) for the MAC-CE having the updated TCI state). At 602, the CORESET X having parameter set 1 may be linked to TCI state 1. When TCI state 1 is used, the CORESET X may use the parameter set 1. At 604, the MAC-CE may change the CORESET X to TCI state 2. That is, CORESET X may be the same CORESET but with a different TCI state. The CORESET X may then utilize parameter set 2, which may be linked to the TCI state 2. The parameter set update may be applied after an activation time of the TCI state. For example, the MAC-CE may change the TCI state, at 604, from TCI state 1 to TCI state 2, and the UE may respond to the MAC-CE with an ACK, at 606, such that 3 ms after the ACK the TCI state and the parameter set 2, which is linked to TCI state 2, may be applied, at 608. Multiple parameter sets may be linked to a particular TCI state. Thus, when the TCI state is changed, at 604, the parameter set may also change.

Rather than the updated TCI state switching the beam from which the CORESET is received by the UE, RRC signaling may be utilized to change the timing/bandwidth of the CORESET. More specifically, a current CORESET may be un-configured so that another CORESET may be reconfigured based on a different bandwidth, perhaps with some level overhead. In an example, a beam 1 may utilize 50 MHz of bandwidth and a beam 2 may utilize 20 MHz. The 50 MHz and the 20 MHz of bandwidth may be determined based on the TCI states. If the TCI state changes, the UE may implicitly/automatically switch the bandwidth from 20 MHz to 50 MHz. The same principle may apply to other parameters as well (e.g., BWP, aggregation levels, number of PDCCH candidates, etc.).

The different behaviors may be associated with different parameters or the different behaviors may be associated with skipping a monitoring occasion of the SS set. For example, in a first aspect, the parameters may change based on the beam (e.g., TCI state) that the UE is using. Example parameters may include, but are not limited to, SS set time, periodicity, and offset; aggregation levels; a number of PDCCH candidates; and a utilized BWP. In a second aspect, the behavior may be based on skipping a SS set monitoring occasion. For example, the UE may refrain from monitoring the SS for a particular beam (e.g., TCI state) via an implicit/automatic skipping mechanism, where monitoring of the SS is skipped based on a switching of the TCI state.

Beam configurations may be based on RRC signaling and may be dynamically modified via DCI or MAC-CE (e.g., using a current TCI update). That is, multiple behaviors may be configured using RRC and linked to different TCI states. Such operations may be associated with network-based determinations (e.g., based on gNB/base station measurements and/or scheduling needs) or UE-based recommendations (e.g., based on UE measurements). The network may determine to use 20 MHz for beam 1 (e.g., as opposed to 50 MHz) or the network may determine to use a particular BWP. The UE may receive beam 1 and determine that there is interference on BWP 1. The UE may also recommend to the base station that whenever information is to be schedule on beam 1 the base station should avoid scheduling the information on BWP 1. Instead, the information may be scheduled on another BWP of beam 1 with less interference. The base station may link beam 1 to BWP 2 so that if beam 1 is used, the UE and the base station may automatically switch to BWP 2 for the CORESET.

Figure 7:
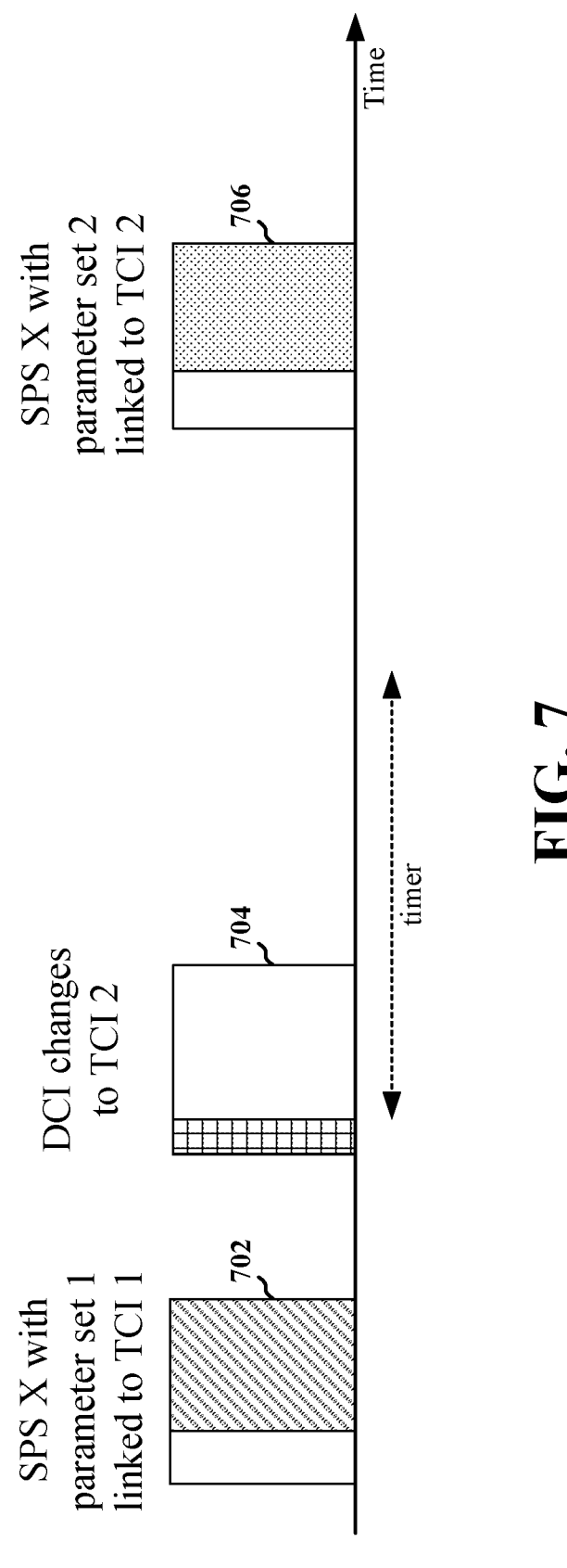
FIG. 7 is an example diagram corresponding to beam-specific semi-persistent scheduling (SPS)/configured grant (CG) parameters.

FIG. 7 is a diagram 700 corresponding to beam-specific SPS/CG parameters. That is, rather than switching the beams, at 604, based on MAC-CE, the beams may be switched, at 704, based on a DCI update. In examples, one or more UEs may be configured with a SPS/CG having different behaviors per subset of beams (e.g., TCI states or spatial relations). A TCI state may include QCL information that the UE may utilize to derive a timing/frequency error and/or transmission/reception spatial filtering for transmitting/receiving a signal. A TCI state may be indicated, e.g., over DCI, which may indicate QCL relationships between another signal and the signal to be transmitted/received. A beam subset may include one or more beams (e.g., TCI states or spatial relations) that may correspond to a same TRP or different TRPs with the same or different PCIs. For example, if the TRPs are different, the TRPs may have a same or different PCI (e.g., the TRPs may correspond to a same cell or different cells).

The UE may utilize a preconfigured SPS/CG behavior for a TCI state or spatial relation (e.g., based on a timer initiated after the DCI changes the TCI state, at 704). At 702, an SPS X having parameter set 1 may be linked to TCI state 1. When TCI state 1 is used, the SPS X may use the parameter set 1. The DCI may change the SPS X, at 704, to TCI state 2. The SPS X may then utilize parameter set 2, which may be linked to the TCI state 2. The parameter set update may be applied, at 706, after a timer interval associated with the DCI changing the TCI state, at 704, from TCI state 1 to TCI state 2. Multiple parameter sets may be linked to a particular TCI state. Thus, when the TCI state is changed, at 704, the parameter set may also change.

The different behaviors may be associated with different parameters or the different behaviors may be associated with skipping an SPS/CG. If beam 1 is being overloaded, such techniques may be used for decreasing a number of UEs that are transmitting or receiving on SPS/CG associated with beam 1 to thereby provide improved scheduling flexibility. Other UEs that are configured for dynamic scheduling may be switched, at 704, from TCI state 1 to TCI state 2, so that the other UEs are not using the SPS/CG on beam 1. Accordingly, an overloading of the scheduler may be decreased. The parameters may change based on the beam (e.g., TCI state or spatial relation) that the UE is using. Example parameters may include, but are not limited to, a number of RBs; a time, a periodicity, and/or an offset; a MCS; a utilized BWP; and a frequency domain offset from a BWP edge. The behavior may also be based on skipping the SPS/CG. For example, the UE may refrain from transmission on CG or receiving on SPS for a particular beam (e.g., TCI state or spatial relation).

The different behavior per beam (e.g., TCI state or spatial relation) may be based on configuring a single SPS/CG with a different behavior per beam (e.g., TCI state or spatial relation). For example, the beams may have multiple SPS/CG configurations. The beams may also be configured with multiple SPS/CG, where the multiple configurations may be respectively applied to the beams (e.g., TCI state or spatial relation). For example, SPS configuration 1 may apply to beam 1 and CG configuration 2 may apply to beam 2. If the beam changes, the SPS configuration may be switched. Further, a combination of such aspects may be based on multiple SPS configurations, where a different behavior may be provided based on each SPS configuration.

Beam configurations may be based on RRC signaling and/or DCI via network-based determinations (e.g., based on gNB/base station measurements and/or scheduling needs) or UE-based recommendations (e.g., based on UE measurements). The network may determine to use a particular bandwidth or BWP. The UE may also receive beam 1 and determine that there is interference on BWP 1. The UE may recommend to the base station that whenever information is to be schedule on beam 1 the base station should avoid scheduling the information on BWP 1. Instead, the information may be scheduled on another BWP of beam 1 with less interference. The base station may link beam 1 to BWP 2 so that if beam 1 is used, the UE and the base station may automatically switch to BWP 2 for the SPS.

Figure 8:
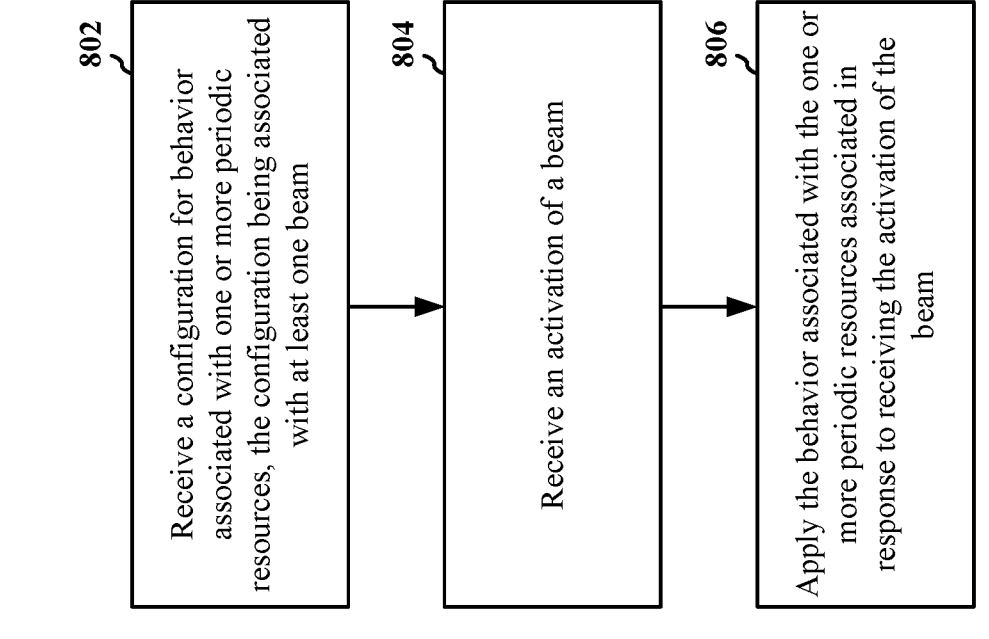
FIG. 8 is a flowchart of a method of wireless communication at a UE.

FIG. 8 is a flowchart 800 of a method of wireless communication. The method may be performed by a UE (e.g., the UE 104/402, the apparatus 1202, etc.), which may include the memory 360 and which may be the entire UE 104/402 or a component of the UE 104/402, such as the TX processor 368, the RX processor 356, and/or the controller/processor 359.

At 802, the UE may receive a configuration for behavior associated with one or more periodic resources, the configuration being associated with at least one beam. For example, referring to FIG. 4, the UE 402 may receive, at 406, a configuration for behavior(s) for periodic resources. The configuration may be for at least one beam received from the base station 404. The reception, at 802, may be performed by the behavioral application component 1240 of the apparatus 1202 in FIG. 12.

At 804, the UE may receive an activation of a beam. For example, referring to FIG. 4, beam activation from the base station 404 may be received, at 408, by the UE 402. The reception, at 804, may be performed by the behavioral application component 1240 of the apparatus 1202 in FIG. 12.

At 806, the UE may apply the behavior associated with the one or more periodic resources associated in response to receiving the activation of the beam. For example, referring to FIG. 4, the UE 402 may apply, at 410, behavior(s) for periodic resources based on the beam activation received at 408 and the configuration received at 406. The application, at 806, may be performed by the behavioral application component 1240 of the apparatus 1202 in FIG. 12.

Figure 9:
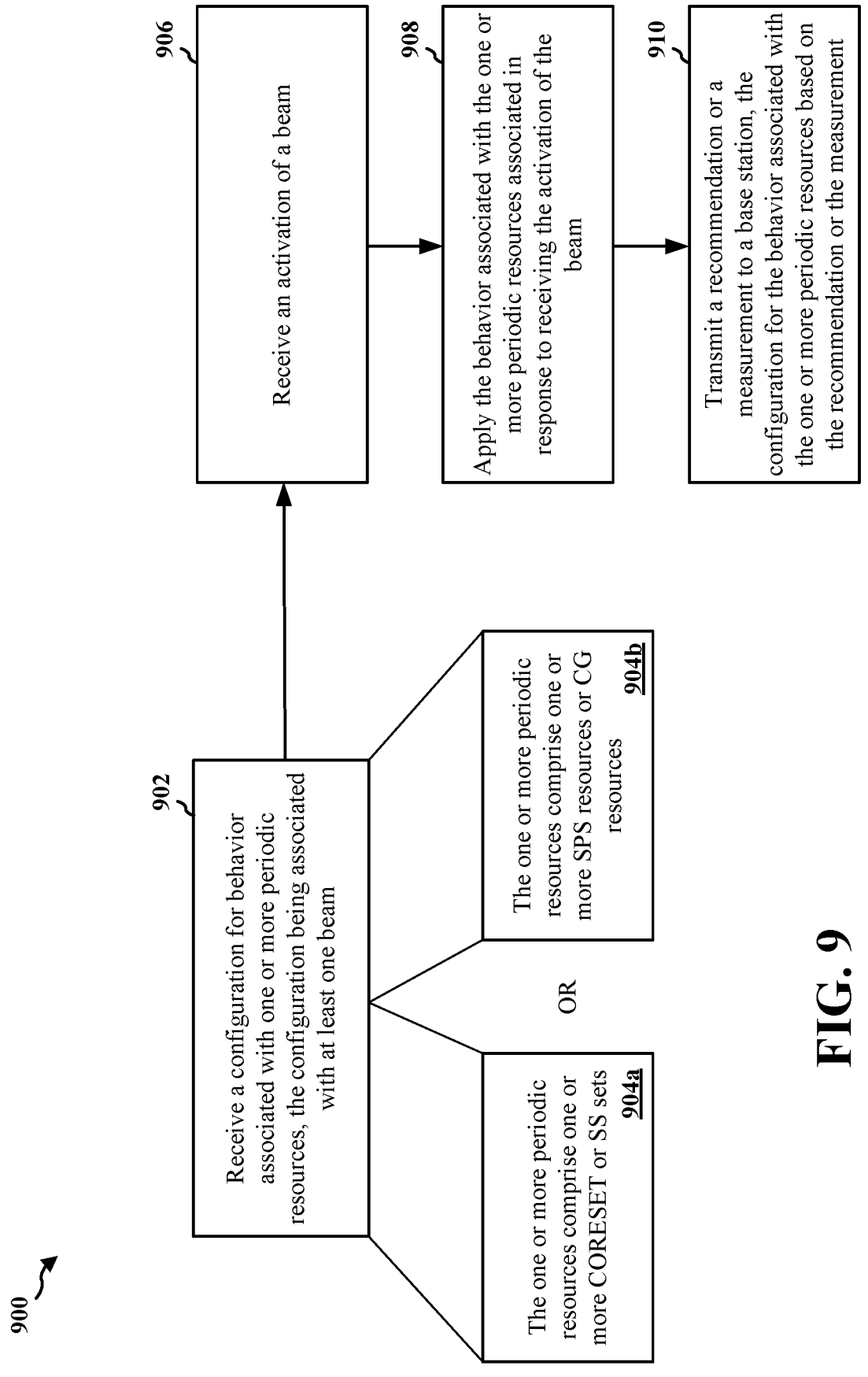
FIG. 9 is a flowchart of a method of wireless communication at a UE.

FIG. 9 is a flowchart 900 of a method of wireless communication. The method may be performed by a UE (e.g., the UE 104/402, the apparatus 1202, etc.), which may include the memory 360 and which may be the entire UE 104/402 or a component of the UE 104/402, such as the TX processor 368, the RX processor 356, and/or the controller/processor 359.

At 902, the UE may receive a configuration for behavior associated with one or more periodic resources, the configuration being associated with at least one beam. For example, referring to FIG. 4, the UE 402 may receive, at 406, a configuration for behavior(s) for periodic resources. The configuration may be for at least one beam received from the base station 404. Referring to FIG. 1, the at least one beam (e.g., communication link 120) may be associated with a single TRP (e.g., base station 102) or the at least one beam (e.g., communication links 120') may be associated with multiple TRPs (e.g., base stations 102'). The reception, at 902, may be performed by the behavioral application component 1240 of the apparatus 1202 in FIG. 12.

At 904a, the one or more periodic resources may comprise one or more CORESET or one or more SS sets. For example, referring to FIG. 4, the periodic resources received at 406 may include a CORESET/SS set. The behavior (e.g., indicated via the configuration received at 406) may include a different set of parameters for at least one of the CORESET or the SS sets, or an indication to reduce or skip SS set monitoring for the at least one beam. The different set of parameters may include at least one of a SS set periodicity, a SS set offset, an aggregation level, a number of PDCCH candidates, or a BWP. In examples, the beam may be indicated (e.g., at 408) by a TCI state.

At 904b, additionally or alternatively, the one or more periodic resources may comprise one or more SPS resources or one or more CG resources. For example, referring to FIG. 4, the periodic resources received at 406 may include SPS/CG. The behavior (e.g., indicated via the configuration received at 406) may include a different set of parameters for the SPS or the CG, or an indication to reduce or skip the SPS resources or the CG resources for the at least one beam. The different set of parameters may include at least one of a number of RBs, a time periodicity, a time offset, a MCS, a BWP, or a frequency domain offset from a BWP edge. In examples, the beam may be indicated (e.g., at 408) by a TCI state or a spatial relation. The configuration (e.g., received at 406) may configure different behavior for a single SPS resource or a single CG resource for different sets of one or more beams. The configuration (e.g., received at 406) may likewise configure different SPS resources or CG resources for different sets of one or more beams. Further, the configuration (e.g., received at 406) may configure different SPS resources or CG resources and different behavior for the different sets of one or more beams.

At 906, the UE may receive an activation of a beam. For example, referring to FIG. 4, beam activation from the base station 404 may be received, at 408, by the UE 402. The configuration for the one or more periodic resources (e.g., received at 406) may be received by the UE 402 in RRC signaling and the activation of the beam (e.g., received at 408) may be received by the UE 402 in DCI or a MAC-CE. Additionally or alternatively, the configuration for the one or more periodic resources (e.g., received at 406) may include a first SPS or a first CG associated with a first beam and a second SPS or a second CG associated with a second beam. The UE 402 may transmit or receive communications based on the first SPS or the first CG (e.g., received at 406) if the UE 402 receives the activation of the first beam (e.g., at 408), and the UE 402 may transmit or receive the communication based on the second SPS or the second CG if the UE 402 receives the activation of the second beam (e.g., at 408). The configuration for the one or more periodic resources (e.g., received at 406) may be further received by the UE 402 in RRC signaling or a first DCI and the activation of the beam (e.g., received at 408) may be received in a second DCI or the MAC-CE. The reception, at 906, may be performed by the behavioral application component 1240 of the apparatus 1202 in FIG. 12.

At 908, the UE may apply the behavior associated with the one or more periodic resources associated in response to receiving the activation of the beam. For example, referring to FIG. 4, the UE 402 may apply, at 410, behavior(s) for periodic resources based on the beam activation received at 408 and the configuration received at 406. The configuration for the one or more periodic resources (e.g., received at 406) may include first behavior for the one or more periodic resources associated with a first beam and second behavior for the one or more periodic resources associated with a second beam. The UE 402 may apply (e.g., at 410) the first behavior if the UE 402 receives the activation of the first beam (e.g., at 408) and the UE 402 may apply (e.g., at 410) the second behavior if the UE 402 receives the activation of the second beam (e.g., at 408). Additionally or alternatively, the configuration for the one or more periodic resources (e.g., received at 406) may include a first periodic resource associated with a first beam and a second periodic resource associated with a second beam, where the UE 402 may apply (e.g., at 410) the first periodic resource if the UE 402 receives the activation of the first beam (e.g., at 408) and the UE 402 may apply the second periodic resource if the UE 402 receives the activation of the second beam (e.g., at 408). The application, at 908, may be performed by the behavioral application component 1240 of the apparatus 1202 in FIG. 12.

At 910, the UE may transmit a recommendation or a measurement to a base station, where the configuration for the behavior associated with the one or more periodic resources is based on the recommendation or the measurement. For example, referring to FIG. 4, the UE 402 may transmit, at 412, a recommendation or measurement to the base station 404. The recommendation or measurement transmitted at 412 may be based on the configuration received at 406 from the base station 404. The transmission, at 910, may be performed by the behavioral application component 1240 of the apparatus 1202 in FIG. 12.

FIG. 10 is a flowchart 1000 of a method of wireless communication. The method may be performed by a base station (e.g., the base station 102/404, the apparatus 1302, etc.), which may include the memory 376 and which may be the entire base station 102/404 or a component of the base station 102/404, such as the TX processor 316, the RX processor 370, and/or the controller/processor 375.

At 1002, the base station may transmit, to a UE, a configuration for behavior associated with one or more periodic resources, the configuration being associated with at least one beam. For example, referring to FIG. 4, the base station 404 may transmit, at 406, a configuration for behavior(s) for periodic resources. The configuration may be for at least one beam transmitted to the UE 402. The transmission, at 1002, may be performed by the behavioral communication component 1340 of the apparatus 1302 in FIG. 13.

At 1004, the base station may transmit, to the UE, an activation of a beam. For example, referring to FIG. 4, beam activation for the UE 402 may be transmitted, at 408, by the base station 404. The transmission, at 1004, may be performed by the behavioral communication component 1340 of the apparatus 1302 in FIG. 13.

At 1006, the base station may transmit or receive communication with the UE based on the behavior configured for the one or more periodic resources associated with the beam that is activated for the UE. For example, referring to FIG. 4, the base station 404 may receive, at 412, a recommendation or measurement from the UE 402 based on the configuration transmitted at 406 and/or the beam activation transmitted at 408. In examples, the base station 404 may transmit communications to the UE 402 based on the recommendation or measurement received at 412. The transmission and/or the reception, at 1006, may be performed by the behavioral communication component 1340 of the apparatus 1302 in FIG. 13.

FIG. 11 is a flowchart 1100 of a method of wireless communication. The method may be performed by a base station (e.g., the base station 102/404, the apparatus 1302, etc.), which may include the memory 376 and which may be the entire base station 102/404 or a component of the base station 102/404, such as the TX processor 316, the RX processor 370, and/or the controller/processor 375.

At 1102, the base station may transmit, to a UE, a configuration for behavior associated with one or more periodic resources, the configuration being associated with at least one beam. For example, referring to FIG. 4, the base station 404 may transmit, at 406, a configuration for behavior(s) for periodic resources. The configuration may be for at least one beam transmitted to the UE 402. Referring to FIG. 1, the at least one beam (e.g., communication link 120) may be associated with a single TRP (e.g., base station 102) or the at least one beam (e.g., communication links 120') may be associated with multiple TRPs (e.g., base stations 102'). In examples, the configuration may be based on network information. The transmission, at 1102, may be performed by the behavioral communication component 1340 of the apparatus 1302 in FIG. 13.

At 1104a, the one or more periodic resources may comprise one or more CORESET or one or more SS sets. For example, referring to FIG. 4, the periodic resources transmitted at 406 may include a CORESET/SS set. The behavior (e.g., indicated via the configuration transmitted at 406) may include a different set of parameters for at least one of the CORESET or the SS sets, or an indication to reduce or skip SS set monitoring for the at least one beam. The different set of parameters may include at least one of a SS set periodicity, a SS set offset, an aggregation level, a number of PDCCH candidates, or a BWP. In examples, the beam may be indicated (e.g., at 408) by a TCI state.

At 1104b, additionally or alternatively, the one or more periodic resources may comprise one or more SPS resources or one or more CG resources. For example, referring to FIG. 4, the periodic resources transmitted at 406 may include SPS/CG. The behavior (e.g., indicated via the configuration transmitted at 406) may include a different set of parameters for the SPS or the CG, or an indication to reduce or skip the SPS resources or the CG resources for the at least one beam. The different set of parameters may include at least one of a number of RBs, a time periodicity, a time offset, a MCS, a BWP, or a frequency domain offset from a BWP edge. In examples, the beam may be indicated (e.g., at 408) by a TCI state or a spatial relation. The configuration (e.g., transmitted at 406) may configure different behavior for a single SPS resource or a single CG resource for different sets of one or more beams. The configuration (e.g., transmitted at 406) may likewise configure different SPS resources or CG resources for different sets of one or more beams. Further, the configuration (e.g., transmitted at 406) may configure different SPS resources or CG resources and different behavior for the different sets of one or more beams.

At 1106, the base station may transmit, to the UE, an activation of a beam. For example, referring to FIG. 4, beam activation for the UE 402 may be transmitted, at 408, by the base station 404. The configuration for the one or more periodic resources (e.g., transmitted at 406) may be transmitted by the base station 404 in RRC signaling and the activation of the beam (e.g., transmitted at 408) may be transmitted by the base station 404 in DCI or a MAC-CE. Additionally or alternatively, the configuration for the one or more periodic resources (e.g., transmitted at 406) may include a first SPS or a first CG associated with a first beam and a second SPS or a second CG associated with a second beam. The base station 404 may transmit or receive communications based on the first SPS or the first CG (e.g., transmitted at 406) if the first beam is activated (e.g., at 408)

for the UE 402 and the base station 404 may transmit or receive communications based on the second SPS or the second CG (e.g., transmitted at 406) if the second beam is activated (e.g., at 408) for the UE 402. The configuration for the one or more periodic resources (e.g., transmitted at 406) may be further transmitted from the base station 404 in RRC signaling or a first DCI and the activation of the beam (e.g., transmitted at 408) may be transmitted in a second DCI or the MAC-CE. The transmission, at 1106, may be performed by the behavioral communication component 1340 of the apparatus 1302 in FIG. 13.

At 1108, the base station may transmit or receive communication with the UE based on the behavior configured for the one or more periodic resources associated with the beam that is activated for the UE. For example, referring to FIG. 4, the base station 404 may receive, at 412, a recommendation or measurement from the UE 402 based on the configuration transmitted at 406 and/or the beam activation transmitted at 408. In examples, the base station 404 may transmit communications to the UE 402 based on the recommendation or measurement received at 412. The configuration for the one or more periodic resources (e.g., transmitted at 406) may include first behavior for the one or more periodic resources associated with a first beam and second behavior for the one or more periodic resources associated with a second beam. The base station 404 may apply the first behavior if the first beam is activated (e.g., at 408) for the UE 402 and the base station 404 may apply the second behavior if the second beam is activated (e.g., at 408) for the UE 402. Additionally or alternatively, the configuration for the one or more periodic resources (e.g., transmitted at 406) may include a first periodic resource associated with a first beam and a second periodic resource associated with a second beam, where the base station 404 may transmit or receive the communication with the UE 402 using the first periodic resource if the first beam is activated (e.g., at 408) for the UE 402 and the base station 404 may transmit or receive the communication with the UE 402 using the second periodic resource if the second beam is activated (e.g., at 408) for the UE 402. The transmission and/or the reception, at 1108, may be performed by the behavioral communication component 1340 of the apparatus 1302 in FIG. 13.

At 1110, the base station may receive a measurement or a recommendation from the UE, where the configuration is based on the measurement or the recommendation from the UE. For example, referring to FIG. 4, the base station 404 may receive, at 412, the measurement or recommendation from the UE 402. In examples, further configurations transmitted to the UE 402 may be based on the measurement or recommendation received from the UE 402. The reception, at 1110, may be performed by the behavioral communication component 1340 of the apparatus 1302 in FIG. 13.

Figure 12:
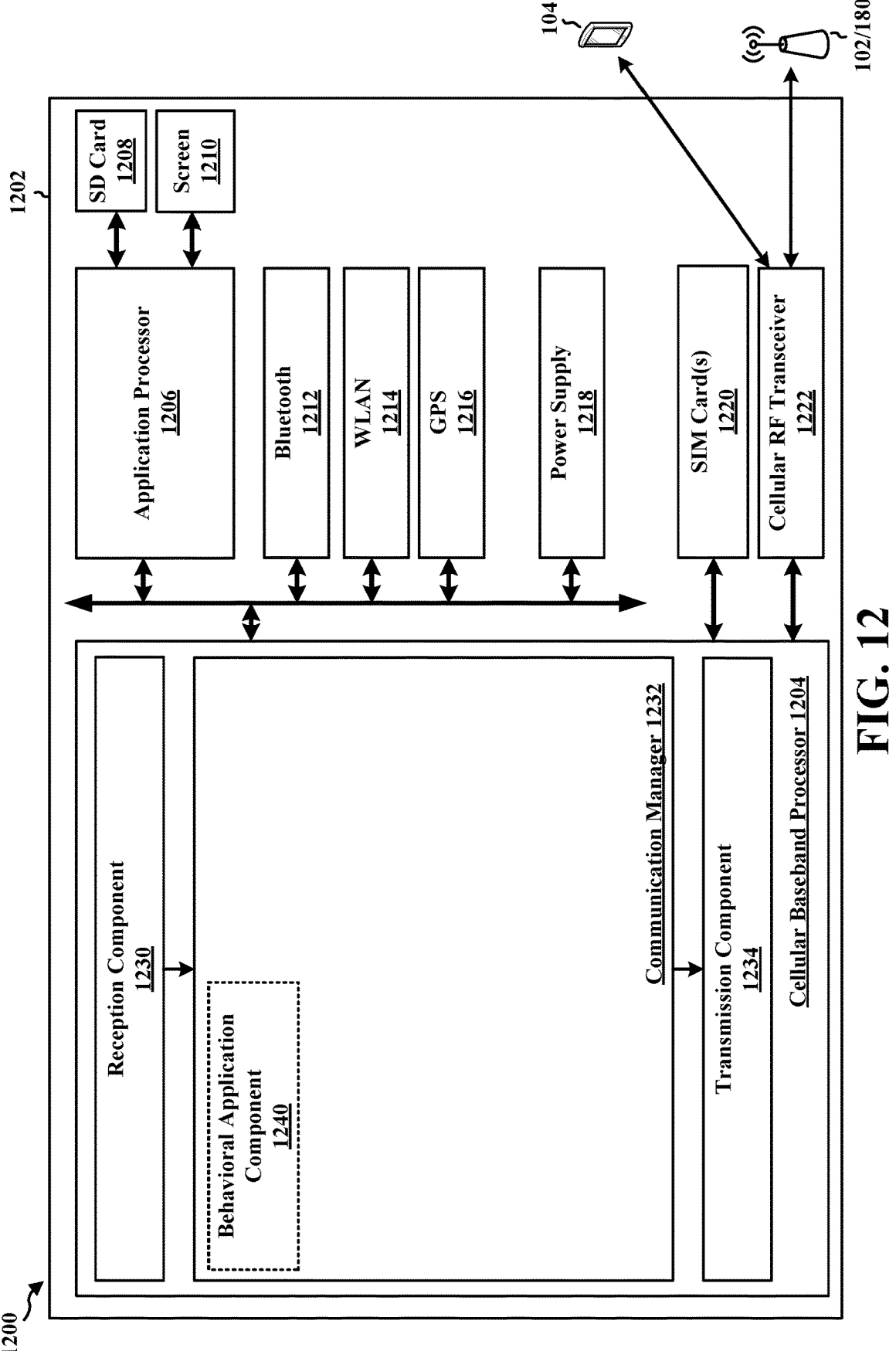
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a behavioral application component 1240 that is configured, e.g., as described in connection with 802, 804, 806, 902, 906, 908, and 910, to receive a configuration for behavior associated with one or more periodic resources, the configuration being associated with at least one beam; to receive an activation of a beam; to apply the behavior associated with the one or more periodic resources associated in response to receiving the activation of the beam; and to transmit a recommendation or a measurement to a base station, where the configuration for the behavior associated with the one or more periodic resources is based on the recommendation or the measurement.

The apparatus may include additional components that perform each of the blocks of the algorithm in the aforementioned flowcharts of FIGS. 8-9. As such, each block in the aforementioned flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving a configuration for behavior associated with one or more periodic resources, the configuration being associated with at least one beam; means for receiving an activation of a beam; and means for applying the behavior associated with the one or more periodic resources associated in response to receiving the activation of the beam. The apparatus 1202 further includes means for transmitting a recommendation or a measurement to a base station, the configuration for the behavior associated with the one or more periodic resources based on the recommendation or the measurement. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
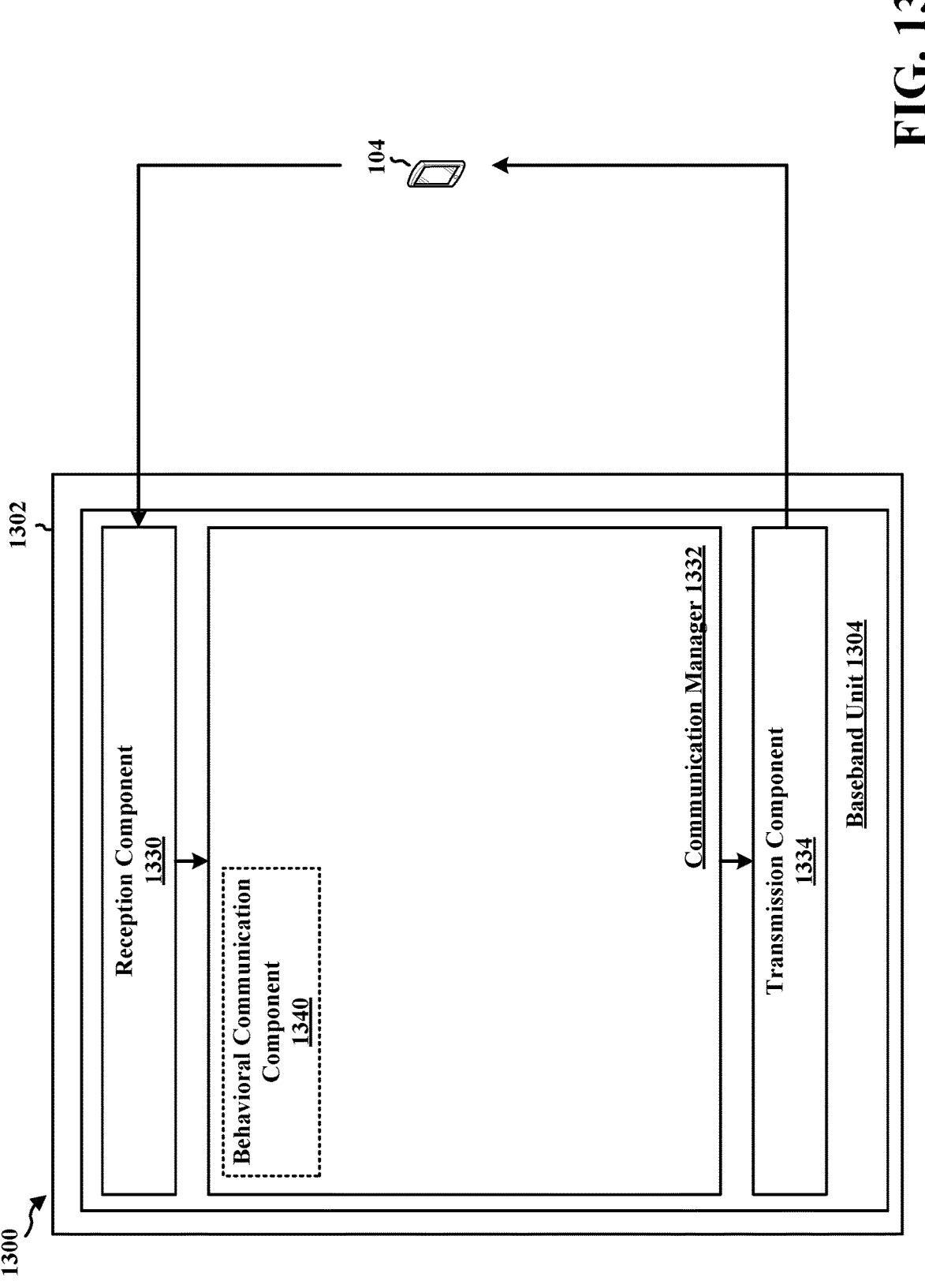
FIG. 13 is a diagram illustrating an example of a hardware implementation for an example apparatus.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes a behavioral communication component 1340 that is configured, e.g., as described in connection with 1002, 1004, 1006, 1102, 1106, 1108, and 1110, to transmit, to a UE, a configuration for behavior associated with one or more periodic resources, the configuration being associated with at least one beam; to transmit, to the UE, an activation of a beam; to transmit a communication to the UE based on the behavior configured for the one or more periodic resources associated with the beam that is activated for the UE; to receive a communication from the UE based on the behavior configured for the one or more periodic resources associated with the beam that is activated for the UE; and to receive a measurement or recommendation from the UE, where the configuration is based on the measurement or the recommendation from the UE.

The apparatus may include additional components that perform each of the blocks of the algorithm in the aforementioned flowcharts of FIGS. 10-11. As such, each block in the aforementioned flowcharts of FIGS. 10-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for transmitting, to a UE, a configuration for behavior associated with one or more periodic resources, the configuration being associated with at least one beam; means for transmitting, to the UE, an activation of a beam; and means for transmitting and/or means for receiving communication with the UE based on the behavior configured for the one or more periodic resources associated with the beam that is activated for the UE. The apparatus 1302 further includes means for receiving a measurement or recommendation from the UE, the configuration being based on the measurement or the recommendation from the UE. The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive a configuration for behavior associated with one or more periodic resources, the configuration being associated with at least one beam; receive an activation of a beam; and apply the behavior associated with the one or more periodic resources associated in response to receiving the activation of the beam.

Aspect 2 may be combined with aspect 1 and includes that the configuration for the one or more periodic resources includes first behavior for the one or more periodic resources associated with a first beam and second behavior for the one or more periodic resources associated with a second beam, and where the UE applies the first behavior if the UE receives the activation of the first beam and applies the second behavior if the UE receives the activation of the second beam.

Aspect 3 may be combined with any of aspects 1-2 and includes that the configuration for the one or more periodic resources includes a first periodic resource associated with a first beam and a second periodic resource associated with a second beam, and where the UE applies the first periodic resource if the UE receives the activation of the first beam and applies the second periodic resource if the UE receives the activation of the second beam.

Aspect 4 may be combined with any of aspects 1-3 and includes that the at least one beam is associated with a single TRP.

Aspect 5 may be combined with any of aspects 1-3 and includes that the at least one beam is associated with multiple TRPs.

Aspect 6 may be combined with any of aspects 1-5 and includes that the one or more periodic resources include one or more CORESET or one or more SS sets.

Aspect 7 may be combined with any of aspects 1-6 and includes that the beam is indicated by a TCI state.

Aspect 8 may be combined with any of aspects 1-7 and includes that the behavior includes a different set of parameters for at least one of the CORESET or the SS sets, or an indication to reduce or skip SS set monitoring for the at least one beam.

Aspect 9 may be combined with any of aspects 1-8 and includes that the different set of parameters includes at least one of a SS set periodicity, a SS set offset, an aggregation level, a number of PDCCH candidates, or a BWP.

Aspect 10 may be combined with any of aspects 1-9 and includes that the configuration for the one or more periodic resources is received in RRC signaling, and where the activation of the beam is received in DCI or a MAC-CE.

Aspect 11 may be combined with any of aspects 1-5 and includes that the one or more periodic resources include one or more SPS resources or CG resources.

Aspect 12 may be combined with any of aspects 1-5 or 11 and includes that the beam is indicated by a TCI state or a spatial relation.

Aspect 13 may be combined with any of aspects 1-5 or 11-12 and includes that the behavior includes a different set of parameters for the SPS or the CG, or an indication to reduce or skip the SPS resources or the CG resources for the at least one beam.

Aspect 14 may be combined with any of aspects 1-5 or 11-13 and includes that the different set of parameters includes at least one of a number of RBs, a time periodicity, a time offset, a MCS, a BWP, or a frequency domain offset from a BWP edge.

Aspect 15 may be combined with any of aspects 1-5 or 11-14 and includes that the configuration for the one or more periodic resources includes a first SPS or a first CG associated with a first beam and a second SPS or a second CG associated with a second beam, and where the UE transmits or receives communication based on the first SPS or the first CG if the UE receives the activation of the first beam and transmits or receives the communication based on the second SPS or the second CG if the UE receives the activation of the second beam.

Aspect 16 may be combined with any of aspects 1-5 or 11-15 and includes that the configuration for the one or more periodic resources is received in RRC signaling or a first DCI, and where the activation of the beam is received in a second DCI or a MAC-CE.

Aspect 17 may be combined with any of aspects 1-5 or 11-16 and includes that the configuration configures different behavior for a single SPS resource or a single CG resource for different sets of one or more beams.

Aspect 18 may be combined with any of aspects 1-5 or 11-17 and includes that the configuration configures different SPS resources or CG resources for different sets of one or more beams.

Aspect 19 may be combined with any of aspects 1-5 or 11-18 and includes that the configuration configures different SPS resources or CG resources and different behavior for different sets of one or more beams.

Aspect 20 may be combined with any of aspects 1-19 and includes that the at least one processor is further configured to transmit a recommendation or a measurement to a base station, where the configuration for the behavior associated with the one or more periodic resources is based on the recommendation or the measurement.

Aspect 21 is an apparatus for wireless communication including at least one processor coupled to a memory and configured to transmit, to a UE, a configuration for behavior associated with one or more periodic resources, the configuration being associated with at least one beam; transmit, to the UE, an activation of a beam; and transmit or receiving communication with the UE based on the behavior configured for the one or more periodic resources associated with the beam that is activated for the UE.

Aspect 22 may be combined with aspect 21 and includes that the configuration for the one or more periodic resources includes first behavior for the one or more periodic resources associated with a first beam and second behavior for the one or more periodic resources associated with a second beam, and wherein the base station applies the first behavior if the first beam is activated for the UE and applies the second behavior if the second beam is activated for the UE.

Aspect 23 may be combined with any of aspects 21-22 and includes that the configuration for the one or more periodic resources includes a first periodic resource associated with a first beam and a second periodic resource associated with a second beam, and wherein the base station transmits or receives the communication with the UE using the first periodic resource if the first beam is activated for the UE and transmits or receives the communication with the UE using the second periodic resource if the second beam is activated for the UE.

Aspect 24 may be combined with any of aspects 21-23 and includes that the at least one beam is associated with a single TRP.

Aspect 25 may be combined with any of aspects 21-23 and includes that the at least one beam is associated with multiple TRPs.

Aspect 26 may be combined with any of aspects 21-25 and includes that the one or more periodic resources include one or more CORESET or one or more SS sets.

Aspect 27 may be combined with any of aspects 21-26 and includes that the beam is indicated by a TCI state.

Aspect 28 may be combined with any of aspects 21-27 and includes that the behavior includes a different set of parameters for at least one of the CORESET or the SS sets, or an indication to reduce or skip SS set monitoring for the at least one beam.

Aspect 29 may be combined with any of aspects 21-28 and includes that the different set of parameters includes at least one of a SS set periodicity, a SS set offset, an aggregation level, a number of PDCCH candidates, or a BWP.

Aspect 30 may be combined with any of aspects 21-29 and includes that the configuration for the one or more periodic resources is transmitted in RRC signaling, and where the activation of the beam is transmitted in DCI or a MAC-CE.

Aspect 31 may be combined with any of aspects 21-25 and includes that the one or more periodic resources include one or more SPS resources or CG resources.

Aspect 32 may be combined with any of aspects 21-25 or 31 and includes that the beam is indicated by a TCI state or a spatial relation.

Aspect 33 may be combined with any of aspects 21-25 or 31-32 and includes that the behavior includes a different set of parameters for the SPS or the CG, or an indication to reduce or skip the SPS resources or the CG resources for the at least one beam.

Aspect 34 may be combined with any of aspects 21-25 or 31-33 and includes that the different set of parameters includes at least one of a number of RBs, a time periodicity, a time offset, a MCS, a BWP, or a frequency domain offset from a BWP edge.

Aspect 35 may be combined with any of aspects 21-25 or 31-34 and includes that the configuration for the one or more periodic resources includes a first SPS or a first CG associated with a first beam and a second SPS or a second CG associated with a second beam, and wherein the base station transmits or receives the communication based on the first SPS or the first CG if the first beam is activated for the UE and the base station transmits or receives the communication based on the second SPS or the second CG if the second beam is activated for the UE.

Aspect 36 may be combined with any of aspects 21-25 or 31-35 and includes that the configuration for the one or more periodic resources is transmitted in RRC signaling or a first DCI, and wherein the activation of the beam is transmitted in a second DCI or a MAC-CE.

Aspect 37 may be combined with any of aspects 21-25 or 31-36 and includes that the configuration configures different behavior for a single SPS resource or a single CG resource for different sets of one or more beams.

Aspect 38 may be combined with any of aspects 21-25 or 31-37 and includes that the configuration configures different SPS resources or CG resources for different sets of one or more beams.

Aspect 39 may be combined with any of aspects 21-25 or 31-38 and includes that the configuration configures different SPS resources or CG resources and different behavior for different sets of one or more beams.

Aspect 40 may be combined with any of aspects 21-39 and includes that the configuration is based on network information.

Aspect 41 may be combined with any of aspects 21-40 and includes that the at least one processor is further configured to receive a measurement or recommendation from the UE, wherein the configuration is based on the measurement or the recommendation from the UE.

Aspect 42 is a method of wireless communication for implementing any of aspects 1-41.

Aspect 43 is an apparatus for wireless communication including means for implementing any of aspects 1-41.

Aspect 44 is a computer-readable medium storing computer executable code, the code when executed by at least one processor causes the at least one processor to implement any of aspects 1-41.

What is claimed is:

1. An apparatus for wireless communication at a user equipment (UE), comprising:
   memory; and
   at least one processor coupled to the memory and configured to:
   receive a configuration for behavior associated with one or more periodic resources in at least one of time or frequency, wherein the configuration indicates a further association of the behavior with at least one transmission configuration indicator (TCI) state or spatial relation having a quasi co-location (QCL) relationship based on a reference signal, and wherein the one or more periodic resources include at least one of:
   one or more control resource sets (CORESETs),
   one or more search space (SS) sets,
   one or more semi-persistent scheduling (SPS) resources, or
   one or more configured grant (CG) resources;
   receive a medium access control-control element (MAC-CE) or a downlink control information (DCI) that indicates an activation of a TCI state or a spatial relation of the at least one TCI state or spatial relation;
   apply, in addition to the QCL relationship of the TCI state or the spatial relation, the behavior associated with the one or more periodic resources in response to reception of the MAC-CE or the DCI that activates the TCI state or the spatial relation that is associated with the configuration for the behavior; and
   transmit, receive, or monitor for communication in the one or more periodic resources based on the behavior configured with an association to the TCI state or the spatial relation.

2. The apparatus of claim 1, wherein the configuration for the one or more periodic resources includes an indication of:
   a first behavior for the one or more periodic resources associated with a first TCI state or a first spatial relation, and
   a second behavior for the one or more periodic resources associated with a second TCI state or a second spatial relation, and
   wherein the at least one processor is configured to apply the first behavior if the UE receives the activation of the first TCI state or the first spatial relation and apply the second behavior if the UE receives the activation of the second TCI state or the second spatial relation.

3. The apparatus of claim 1, wherein the configuration for the one or more periodic resources includes an indication of:
   a first periodic resource associated with a first TCI state or a first spatial relation, and
   a second periodic resource associated with a second TCI state or a second spatial relation, and wherein the at least one processor is configured to:

transmit, receive, or monitor for the communication in the first periodic resource if the UE receives the activation of the first TCI state or the first spatial relation, and transmit, receive, or monitor for the communication in the second periodic resource if the UE receives the activation of the second TCI state or the second spatial relation.

4. The apparatus of claim 1, wherein the at least one TCI state or spatial relation is associated with a single transmission reception point (TRP).

5. The apparatus of claim 1, wherein the at least one TCI state or spatial relation is associated with multiple transmission reception points (TRPs).

6. The apparatus of claim 1, wherein the one or more periodic resources comprise the one or more CORESETs or the one or more SS sets.

7. The apparatus of claim 6, wherein the MAC-CE or the DCI activates the TCI state, and wherein the configuration indicates:

a first set of CORESET parameters or a first set of SS set parameters associated with a first TCI state or a first spatial relation, and a second set of CORESET parameters or a second set of SS set parameters associated with a second TCI state or a second spatial relation, and wherein the at least one processor is configured to:

monitor the one or more CORESETs or the one or more SS sets based on the first set of CORESET parameters or the first set of SS set parameters if the first TCI state or the first spatial relation is activated, and monitor the one or more CORESETs or the one or more SS sets based on the second set of CORESET parameters or the second set of SS set parameters if the second TCI state or the second spatial relation is activated.

8. The apparatus of claim 6, wherein the behavior includes an indication to reduce or skip SS set monitoring when the at least one TCI state or spatial relation is activated, and wherein the at least one processor is configured to reduce or skip monitoring the one or more SS sets in response to the activation of the TCI state or the spatial relation.

9. The apparatus of claim 7, wherein the first set of CORESET parameters, the first set of SS set parameters, the second set of CORESET parameters, or the second set of parameters include at least one of:

a SS set periodicity, a SS set offset, an aggregation level, a number of physical downlink control channel (PDCCH) candidates, or a bandwidth part (BWP).

10. The apparatus of claim 6, wherein the configuration for the one or more periodic resources is received in radio resource control (RRC) signaling.

11. The apparatus of claim 1, wherein the one or more periodic resources comprise the one or more SPS resources or CG resources.

12. The apparatus of claim 11, wherein a beam is indicated by the TCI state or the spatial relation.

13. The apparatus of claim 11, wherein the behavior includes a different set of parameters for the SPS or the CG, or an indication to reduce or skip the SPS resources or the CG resources for the at least one TCI state or spatial relation.

14. The apparatus of claim 13, wherein the different set of parameters includes at least one of a number of resource blocks (RBs), a time periodicity, a time offset, a modulation and coding scheme (MCS), a bandwidth part (BWP), or a frequency domain offset from a BWP edge.

15. The apparatus of claim 11, wherein the configuration for the one or more periodic resources includes a first SPS or a first CG associated with a first beam and a second SPS or a second CG associated with a second beam, and wherein the UE transmits or receives communication based on the first SPS or the first CG if the UE receives the activation of the first beam and transmits or receives the communication based on the second SPS or the second CG if the UE receives the activation of the second beam.

16. The apparatus of claim 11, wherein the configuration for the one or more periodic resources is received in radio resource control (RRC) signaling or a first downlink control information (DCI).

17. The apparatus of claim 11, wherein the configuration configures different behavior for a single SPS resource or a single CG resource for different sets of one or more beams.

18. The apparatus of claim 11, wherein the configuration configures different SPS resources or CG resources for different sets of one or more beams.

19. The apparatus of claim 11, wherein the configuration configures different SPS resources or CG resources and different behavior for different sets of one or more beams.

20. The apparatus of claim 1, wherein the at least one processor is further configured to transmit a recommendation or a measurement to a base station, wherein the configuration for the behavior associated with the one or more periodic resources is based on the recommendation or the measurement.

21. An apparatus for wireless communication at a base station, comprising:

memory; and at least one processor coupled to the memory and configured to:

transmit, to a user equipment (UE), a configuration for behavior associated with one or more periodic resources in at least one of time or frequency, wherein the configuration indicates a further association of the behavior with at least one transmission configuration indicator (TCI) state or spatial relation having a quasi co-location (QCL) relationship based on a reference signal, and wherein the one or more periodic resources include at least one of:

one or more control resource sets (CORESETs), one or more search space (SS) sets, one or more semi-persistent scheduling (SPS) resources, or one or more configured grant (CG) resources;

transmit, to the UE, a medium access control-control element (MAC-CE) or a downlink control information (DCI) that indicates an activation of a TCI state or a spatial relation of the at least one TCI state or spatial relation; and transmit or receive communication with the UE based on the behavior configured for the one or more periodic resources based on the activation of the TCI state or the spatial relation that is associated with the configuration for the behavior in addition to the QCL relationship of the TCI state or the spatial relation.

22. The apparatus of claim 21, wherein the configuration for the one or more periodic resources includes an indication of:

a first behavior for the one or more periodic resources associated with a first TCI state or a first spatial relation, and a second behavior for the one or more periodic resources associated with a second TCI state or a second spatial relation, and wherein the at least one processor is configured to apply the first behavior if the first TCI state or the first spatial relation is activated for the UE and applies the second behavior if the second TCI state or the second spatial relation is activated for the UE.

23. The apparatus of claim 21, wherein the configuration for the one or more periodic resources includes an indication of:

a first periodic resource associated with a first TCI state or a first spatial relation, and a second periodic resource associated with a second TCI state or a second spatial relation, and wherein the at least one processor is configured to:

transmit or receive the communication with the UE using the first periodic resource if the first TCI state or a first spatial relation is activated for the UE, and transmit or receive the communication with the UE using the second periodic resource if the second TCI state or the second spatial relation is activated for the UE.

24. The apparatus of claim 21, wherein the at least one TCI state or spatial relation is associated with a single transmission reception point (TRP) or with multiple transmission reception points (TRPs).

25. The apparatus of claim 21, wherein the configuration indicates:

a first set of CORESET parameters or a first set of SS set parameters associated with a first TCI state or a first spatial relation, and a second set of CORESET parameters or a second set of SS set parameters associated with a second TCI state or a second spatial relation, and wherein the at least one processor is configured to:

transmit in the one or more CORESETs or the one or more SS sets based on the first set of CORESET parameters or the first set of SS set parameters if the first TCI state or the first spatial relation is activated, and transmit in the one or more CORESETs or the one or more SS sets based on the second set of CORESET parameters or the second set of SS set parameters if the second TCI state or the second spatial relation is activated.

26. The apparatus of claim 21, wherein the one or more periodic resources comprise the one or more CORESETs or the one or more SS sets.

27. The apparatus of claim 26, wherein the behavior includes an indication to reduce or skip SS set monitoring for the at least one TCI state or spatial relation, and wherein the at least one processor is configured to reduce or skip transmissions in the one or more SS sets based on based on the activation of the TCI state or the spatial relation.

28. The apparatus of claim 21, wherein the one or more periodic resources comprise the one or more SPS semi persistent scheduling (SPS) resources or CG configured grant (CG) resources.

29. The apparatus of claim 21, wherein the at least one processor is further configured to receive a measurement or recommendation from the UE, wherein the configuration is based on the measurement or the recommendation from the UE.

30. A method of wireless communication at a user equipment (UE), comprising:

receiving a configuration for behavior associated with one or more periodic resources in at least one of time or frequency, wherein the configuration indicates a further association of the behavior with at least one transmission configuration indicator (TCI) state or spatial relation having a quasi co-location (QCL) relationship based on a reference signal, and wherein the one or more periodic resources include at least one of:

one or more control resource sets (CORESETs), one or more search space (SS) sets, one or more semi-persistent scheduling (SPS) resources, or one or more configured grant (CG) resources;

receiving a medium access control-control element (MAC-CE) or a downlink control information (DCI) that indicates an activation of a TCI state or a spatial relation of the at least one TCI state or spatial relation;

applying, in addition to the QCL relationship of the TCI state or the spatial relation, the behavior associated with the one or more periodic resources in response to reception of the MAC-CE or the DCI that activates the TCI state or the spatial relation that is associated with the configuration for the behavior; and transmitting, receiving, or monitoring for communication in the one or more periodic resources based on the behavior configured with an association to the TCI state or the spatial relation.

* * * * *